United States Patent
Tseng et al.

(10) Patent No.: US 11,714,162 B2
(45) Date of Patent: *Aug. 1, 2023

(54) CONTROL METHOD FOR OPTICAL TRACKING SYSTEM

(71) Applicant: HTC Corporation, Taoyuan (TW)

(72) Inventors: Mong-Yu Tseng, Taoyuan (TW); Sheng-Long Wu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

This patent is subject to a terminal disclaimer.

(21) Appl. No.: 16/727,945

(22) Filed: Dec. 27, 2019

(65) Prior Publication Data

US 2020/0137269 A1    Apr. 30, 2020

Related U.S. Application Data

(63) Continuation of application No. 15/697,468, filed on Sep. 7, 2017, now Pat. No. 10,530,972.

(60) Provisional application No. 62/397,358, filed on Sep. 21, 2016.

(51) Int. Cl.
| | |
|---|---|
| *H04N 5/222* | (2006.01) |
| *G06V 10/40* | (2022.01) |
| *G06K 9/62* | (2022.01) |
| *G01S 5/16* | (2006.01) |
| *G01S 11/12* | (2006.01) |
| *G06F 18/00* | (2023.01) |
| *G06T 7/80* | (2017.01) |

(52) U.S. Cl.
CPC ............... *G01S 5/16* (2013.01); *H04N 5/222* (2013.01); *G01S 11/12* (2013.01); *G06F 18/00* (2023.01); *G06T 7/80* (2017.01)

(58) Field of Classification Search
CPC ........... H04N 5/23299; H04N 5/23296; H04N 13/246; G06K 9/46; G06K 9/00516; G06K 9/6251; G06K 9/6857; G01S 5/16
USPC ......... 382/154, 298, 103–104, 106–107, 100
See application file for complete search history.

(56) References Cited

U.S. PATENT DOCUMENTS

| | | |
|---|---|---|
| 8,917,905 B1 | 12/2014 | Dill |
| 9,028,072 B2 | 5/2015 | Chang et al. |
| 2007/0210266 A1 | 9/2007 | Liu et al. |
| 2009/0096790 A1 | 4/2009 | Wiedemann et al. |

(Continued)

FOREIGN PATENT DOCUMENTS

| | | |
|---|---|---|
| CN | 102625944 A | 8/2012 |
| CN | 103576428 A | 2/2014 |

(Continued)

OTHER PUBLICATIONS

Corresponding Taiwan office action dated May 3, 2018.
Corresponding Chinese office action dated Feb. 3, 2020.

*Primary Examiner* — Leon Viet Q Nguyen
(74) *Attorney, Agent, or Firm* — CKC & Partners Co., LLC

(57) ABSTRACT

An optical tracking system includes optical source devices. The optical source devices are configured to emitting optical signals. A control method, suitable for the optical tracking system, includes following operations. A dimensional scale to be covered by the optical tracking system is obtained. Signal strength of the optical signals provided by the optical source devices is adjusted according to the dimensional scale. The signal strength of the optical signals is positively correlated with the dimensional scale.

15 Claims, 10 Drawing Sheets

(56) References Cited

U.S. PATENT DOCUMENTS

| | | | |
|---|---|---|---|
| 2013/0128054 A1* | 5/2013 | Densham | G03B 21/53 |
| | | | 348/169 |
| 2013/0147959 A1 | 6/2013 | Wang et al. | |
| 2014/0254874 A1 | 9/2014 | Kurz et al. | |
| 2015/0049113 A1 | 2/2015 | Rahman et al. | |
| 2016/0101358 A1 | 4/2016 | Ibrahim et al. | |
| 2017/0212408 A1* | 7/2017 | Ma | H04N 5/23296 |

FOREIGN PATENT DOCUMENTS

| | | |
|---|---|---|
| CN | 104237846 A | 12/2014 |
| DE | 102005047481 A1 | 4/2007 |
| JP | 2008505374 A | 2/2008 |
| TW | 201326894 A | 7/2013 |
| TW | 201326896 A | 7/2013 |

\* cited by examiner

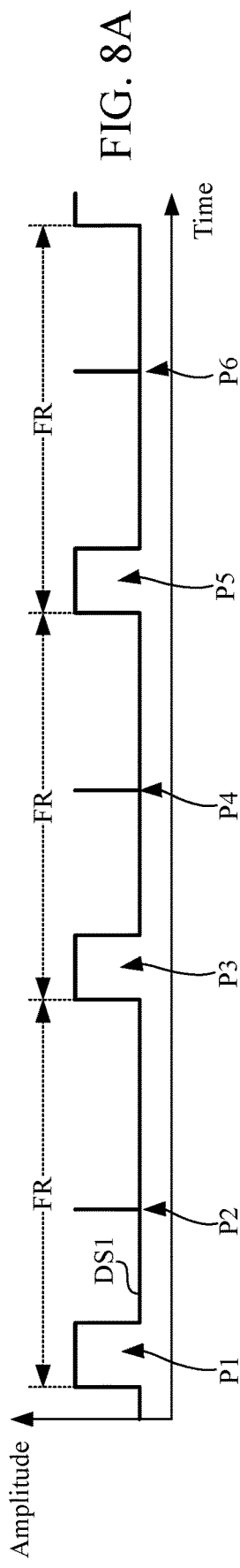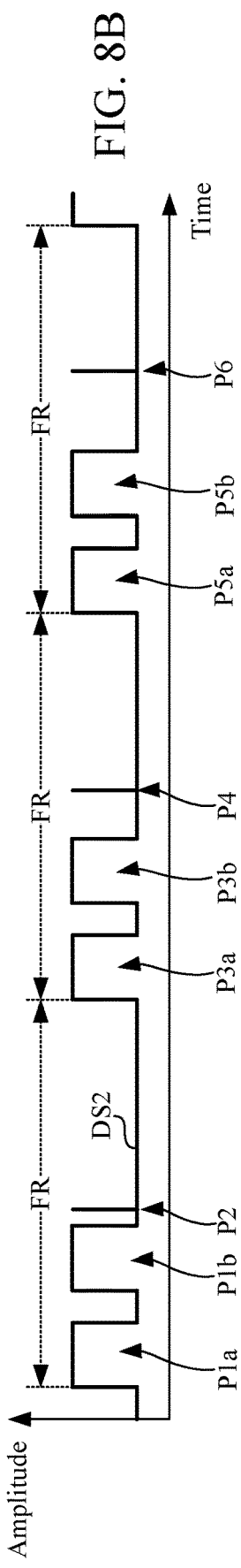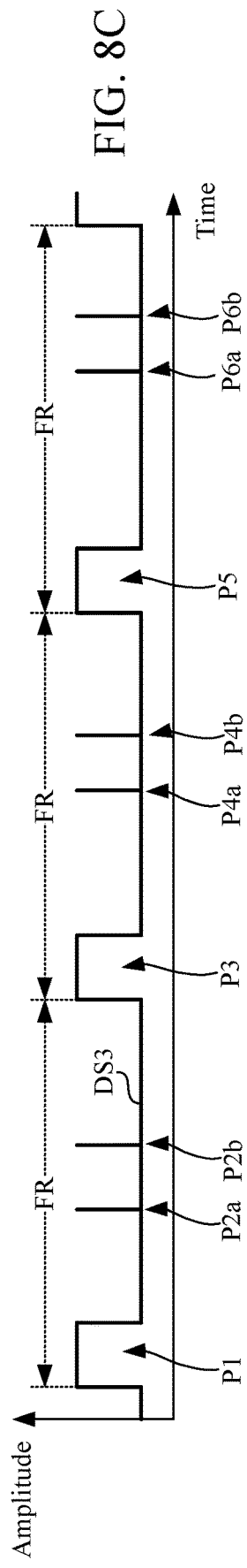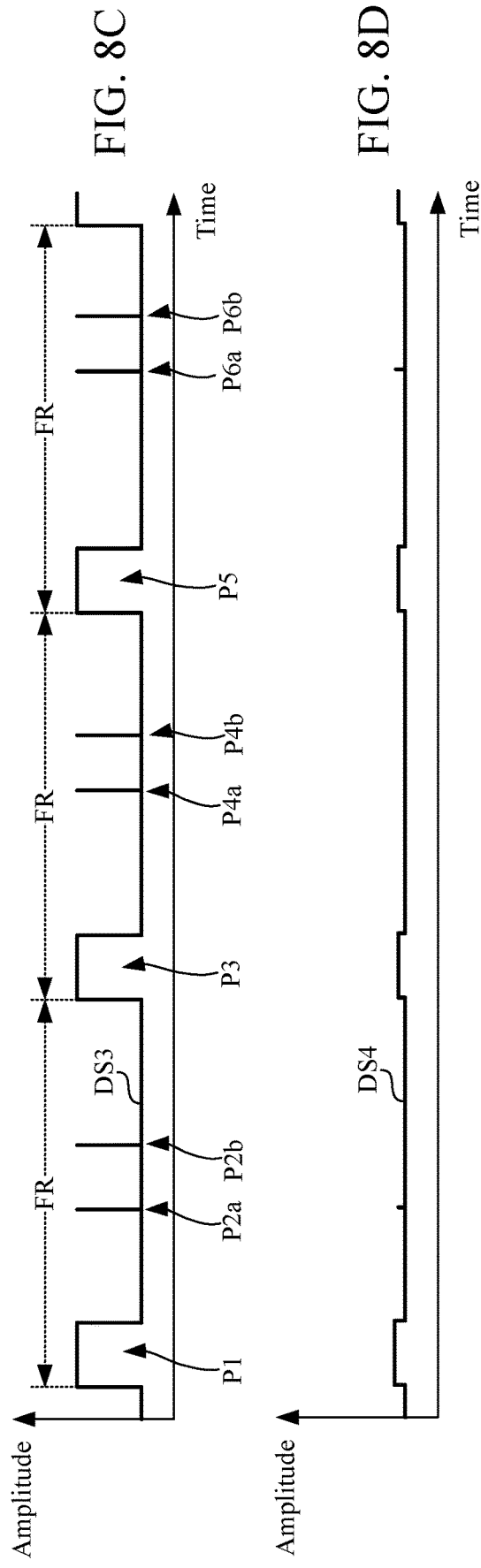

CONTROL METHOD FOR OPTICAL TRACKING SYSTEM

RELATED APPLICATIONS

This application is a continuation of U.S. application Ser. No. 15/697,468, filed on Sep. 7, 2017 which claims priority to U.S. Provisional Application Ser. No. 62/397,358, filed on Sep. 21, 2016, all of which is herein incorporated by reference.

BACKGROUND

Field of Invention

The present application relates to an optical tracking system. More particularly, the present application relates to a control method about how to control the optical tracking system.

Description of Related Art

Tracking systems are utilized in locate a position of a target object in a space. In virtual reality (VR), augmented reality (AR), substitutional reality (SR) or mixed reality (MR) applications, the tracking system is one of the main components. The tracking systems can detect the positions of the user, the head mounted display (HMD) and/or controllers, and provides the positional data to a host of the reality system. The tracking systems can sense the position and/or orientation of the user's point of view. In some advanced tracking systems, the target user can freely move in a room area, and the position of the target user can be obtained by the tracking system.

An optical tracking system is one solution to achieve the tracking systems. Optical signals are transmitted from sources to receivers, and the positions of the target object can be calculated according to the received optical signals.

SUMMARY

An embodiment of the disclosure provides a control method, which is suitable for an optical tracking system including optical source devices. The optical source devices are configured to emitting optical signals. The control method includes following operations. A dimensional scale to be covered by the optical tracking system is obtained. Signal strength of the optical signals provided by the optical source devices is adjusted according to the dimensional scale. The signal strength of the optical signals is positively correlated with the dimensional scale.

Another embodiment of the disclosure provides a control method, which is suitable for an optical tracking system including optical source devices. The optical source devices are configured to emitting optical signals. The optical tracking system is configured to track a position of an electronic device. The electronic device includes an optical sensing module configured to sense detection signals corresponding to the optical signals from the optical source devices. The control method includes following operations. Signal strength of the optical signals is reduced in response to that an unexpected event is detected by the optical sensing module in the detection signals. The signal strength of the optical signals is increased in response to that the optical sensing module fails to detect the predetermined emitting pattern within the detection signals.

Another embodiment of the disclosure provides an optical tracking system, which includes optical source devices and a control module. The optical source devices are configured to emitting optical signals. The control module is communicated with the optical source devices. The control module is configured to obtain a dimensional scale to be covered by the optical tracking system, and to adjust a signal strength of the optical signals provided by the optical source devices according to the dimensional scale. The control module adjusts the signal strength in positive correlation with the dimensional scale.

It is to be understood that both the foregoing general description and the following detailed description are by examples, and are intended to provide further explanation of the invention as claimed.

BRIEF DESCRIPTION OF THE DRAWINGS

The disclosure can be more fully understood by reading the following detailed description of the embodiment, with reference made to the accompanying drawings as follows:

FIGS. 8A-8D illustrate waveforms of one detection signal detected by an optical sensing module corresponding to different embodiments.

DETAILED DESCRIPTION

Figure 1:
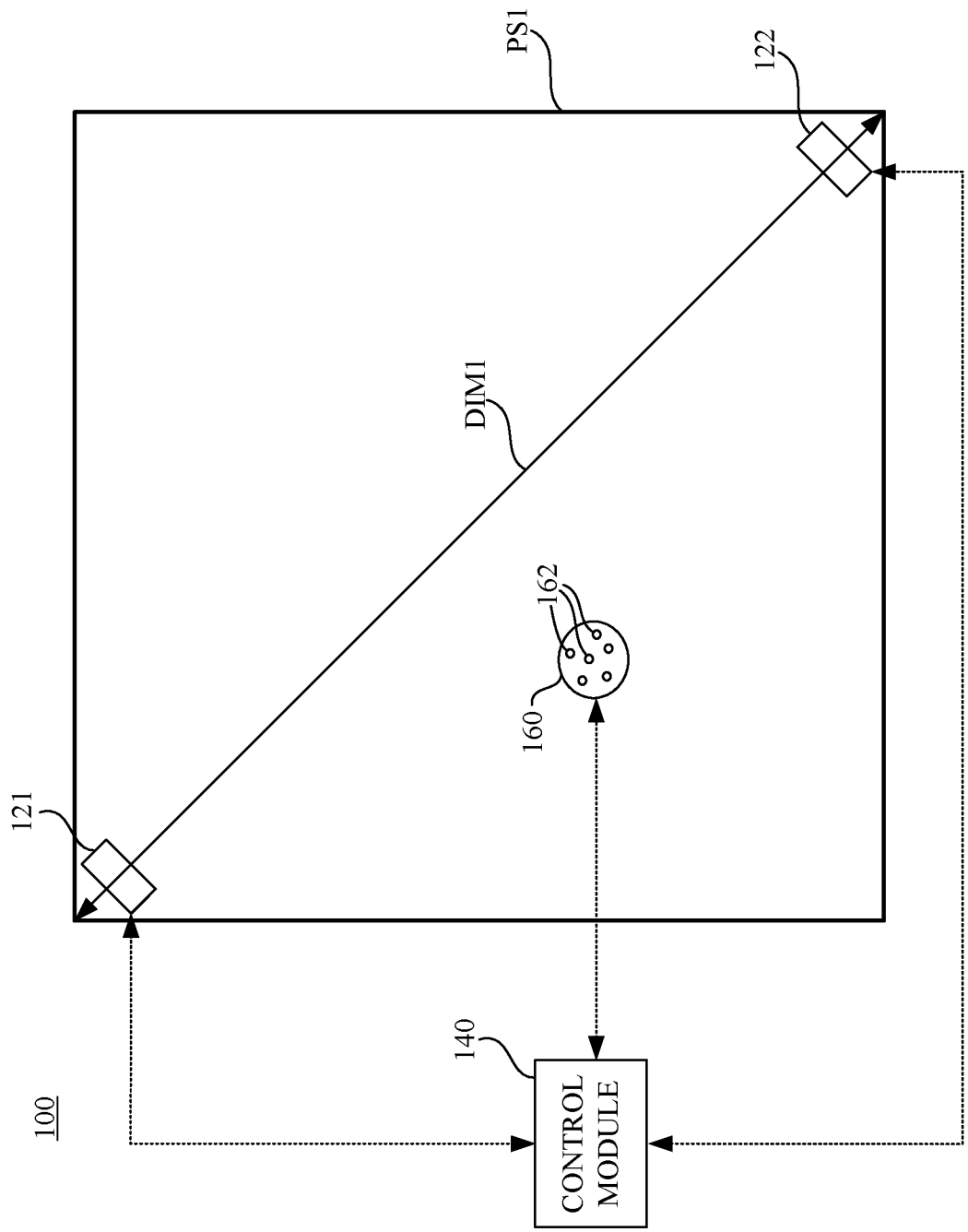
FIG. 1 is a schematic diagram illustrating a top view of an optical tracking system according to an embodiment of this disclosure.

Reference will now be made in detail to the present embodiments of the disclosure, examples of which are illustrated in the accompanying drawings. Wherever possible, the same reference numbers are used in the drawings and the description to refer to the same or like parts.

Reference is made to FIG. 1. FIG. 1 is a schematic diagram illustrating a top view of an optical tracking system 100 according to an embodiment of this disclosure. The optical tracking system 100 includes at least one optical source device for emitting at least one optical signal. The optical signal can be utilized to locate an object in a physical space PS1.

In the embodiment shown in FIG. 1, the optical tracking system 100 includes two optical source devices 121 and 122. The optical source device 121 includes at least one optical emitter (e.g., a light emitting diode and/or a laser generator) configured to emit an optical signal at a signal strength into the physical space PS1. Similarly, the optical source device 122 includes at least one optical emitter (e.g., a light emitting diode and/or a laser generator) configured to emit another optical signal at a signal strength into the physical space PS1.

In an embodiment shown in FIG. 1, the optical tracking system 100 is configured to track a position of an electronic device 160 located within the physical space PS1. When the electronic device 160 moves around in the physical space PS1, the optical signals provided by the optical source devices 121 and 122 can be sensed by an optical sensing module 162 on the electronic device, so as to calculate the position of the electronic device 160.

In the embodiment shown in FIG. 1, the optical sensing module 162 can be an optical sensing array formed by multiple optical sensors. In this case, each of the optical sensors of the optical sensing array is able to sense the optical signals from the optical source devices 121 and 122 with slightly time differences and amplitude differences. A distance between the electronic device 160 and the optical source device 121 can be calculated according to the time differences and amplitude differences detected between the optical sensors of the optical sensing array. Another distance between the electronic device 160 and the optical source device 122 can be calculated according to the time differences and amplitude differences detected by the optical sensors of the optical sensing array.

In some other embodiments, the optical sensing module 162 can include one optical sensor. In this case, the optical sensor is able to sense the optical signals from the optical source devices 121 and 122. Distances between the electronic device 160 and the optical source device 121 and between the electronic device 160 and the optical source device 122 can be calculated according to a detection signal generated by the optical sensing module 162.

However, the optical tracking system 100 is not limited to two optical source devices 121 and 122. In another embodiment, the tracking system 100 can include more than two optical source devices respectively disposed at different corners of the physical space PS1 (e.g., four optical source devices disposed at four corners of the physical space PS1, or more than four optical source devices to cover another physical space larger than the physical space PS1), so as to elevate preciseness and/or processing speed of tracking function of the optical tracking system 100. In still another embodiment, the tracking system 100 can include one singular optical source device disposed around one corner of the physical space PS1.

In an embodiment, the electronic device 160 can be a head mounted display (HMD) of a virtual reality system. The position of the head mounted display can be tracked by the optical tracking system 100, and provided to the virtual reality system, such that the virtual reality system can acknowledge the position of the user wearing the head mounted display and provide a corresponding view to the user. However, the electronic device 160 is not limited to the head mounted display. In another embodiment, the electronic device 160 can be a hand-hold controller, a tracker component or other equivalent object to be tracked.

In the embodiment shown in FIG. 1, the optical tracking system 100 further includes a control module 140. The control module 140 is communicated with the optical source device 121, the optical source device 122 and the electronic device 160. In some embodiment, the control module 140 communicates with the optical source device 121, the optical source device 122 and the electronic device 160 over a wiring connection or a wireless telecommunication (e.g., Bluetooth, WiFi, WiFi-direct, RFID or Zigbee). The control module 140 can be implemented by a personal computer or a host server. The control module 140 includes a communication transceiver for establishing aforesaid communication to optical source device 121, the optical source device 122 and the electronic device 160. The control module 140 in this embodiment is configured to control the signal strength of the optical signals emitted by the optical source devices 121 and 122. The control module 140 further includes a processor, a central processing unit or a graphic processing unit for calculating a suitable level of the signal strength of the optical signals. Further details about how to control the signal strength of the optical signals emitted by the optical source devices 121 and 122 are discussed in following paragraphs.

Figure 2:
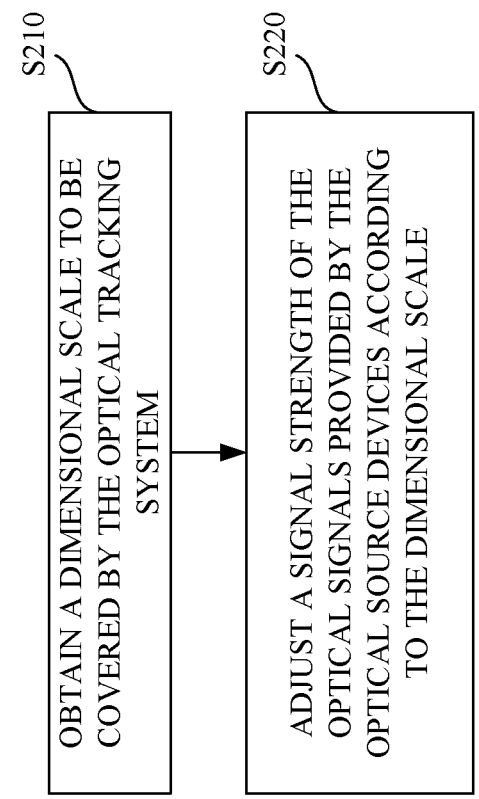
FIG. 2 is a flow diagram illustrating a control method according to an embodiment of the disclosure.

Reference is further made to FIG. 2, which is a flow diagram illustrating a control method 200 according to an embodiment of the disclosure. The control method 200 in FIG. 2 is suitable to be utilized on the optical tracking system 100 in FIG. 1 to control the signal strength of the optical signals emitted by the optical source devices 121 and 122. As shown in FIG. 2, operation S210 of the control method 200 is executed by the control module 140 to obtain a dimensional scale to be covered by the optical tracking system 100. In the embodiment shown in FIG. 1, the physical space PS1 to be covered by the optical tracking system 100 has a dimensional scale DIM1. The dimensional scale DIM1 can be measured by a length and a width, a diagonal length, an area or a volume of the physical space PS1 to be covered by the optical tracking system 100. In the embodiment shown in FIG. 1, the dimensional scale DIM1 is represented by the diagonal length of the physical space PS1.

Figure 3:
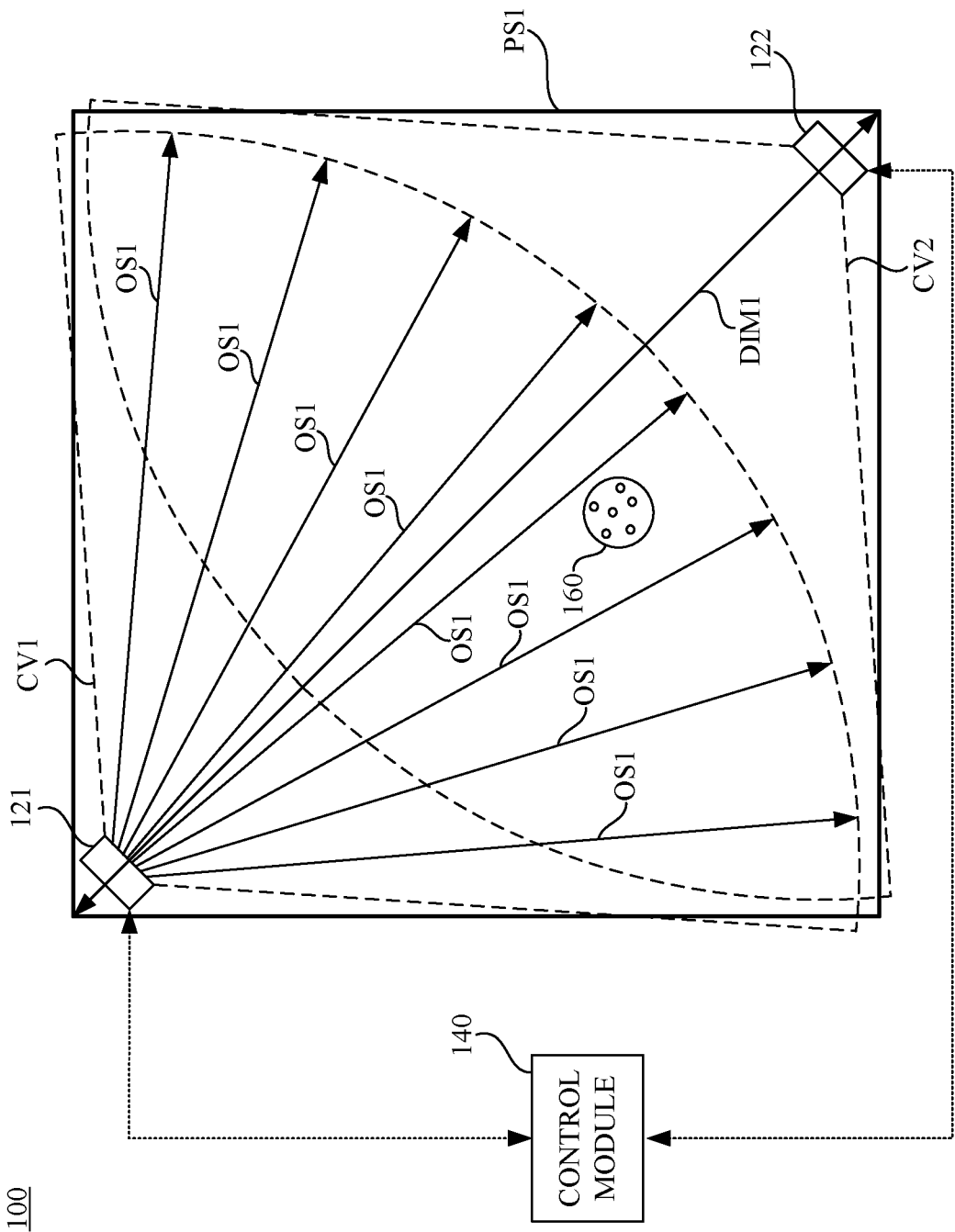
FIG. 3 is a schematic diagram illustrating a top view of coverage regions of the optical signals from the optical source devices in an embodiment.

Reference is further made to FIG. 3. FIG. 3 is a schematic diagram illustrating a top view of a coverage region CV1 of the optical signal OS1 from the optical source device 121 and another coverage region CV2 of the optical signal (not marked on the FIG. 3 for brevity) from the optical source device 122 in the physical space PS1 with the dimensional scale DIM1. In the embodiment shown in FIG. 3, the optical source device 121 emits the optical signal OS1 at a first strength level to form the coverage region CV1, and the optical source device 122 also emits the optical signal at the first strength level to form the coverage region CV2. In the embodiment shown in FIG. 3, the coverage regions CV1 and CV2 are about to cover the whole physical space PS1 with the dimensional scale DIM1 without significantly extending beyond the border of the physical space PS1.

The coverage regions CV1 and CV2 are determined by the signal strength of the optical signals emitted by the optical source devices 121 and 122. When the optical source device 121 emits the optical signal OS1 with higher signal strength, the coverage regions CV1 will be larger. On the other hand, when the optical source device 121 emits the optical signal OS1 with lower signal strength, the coverage regions CV1 will be smaller.

Figure 4:
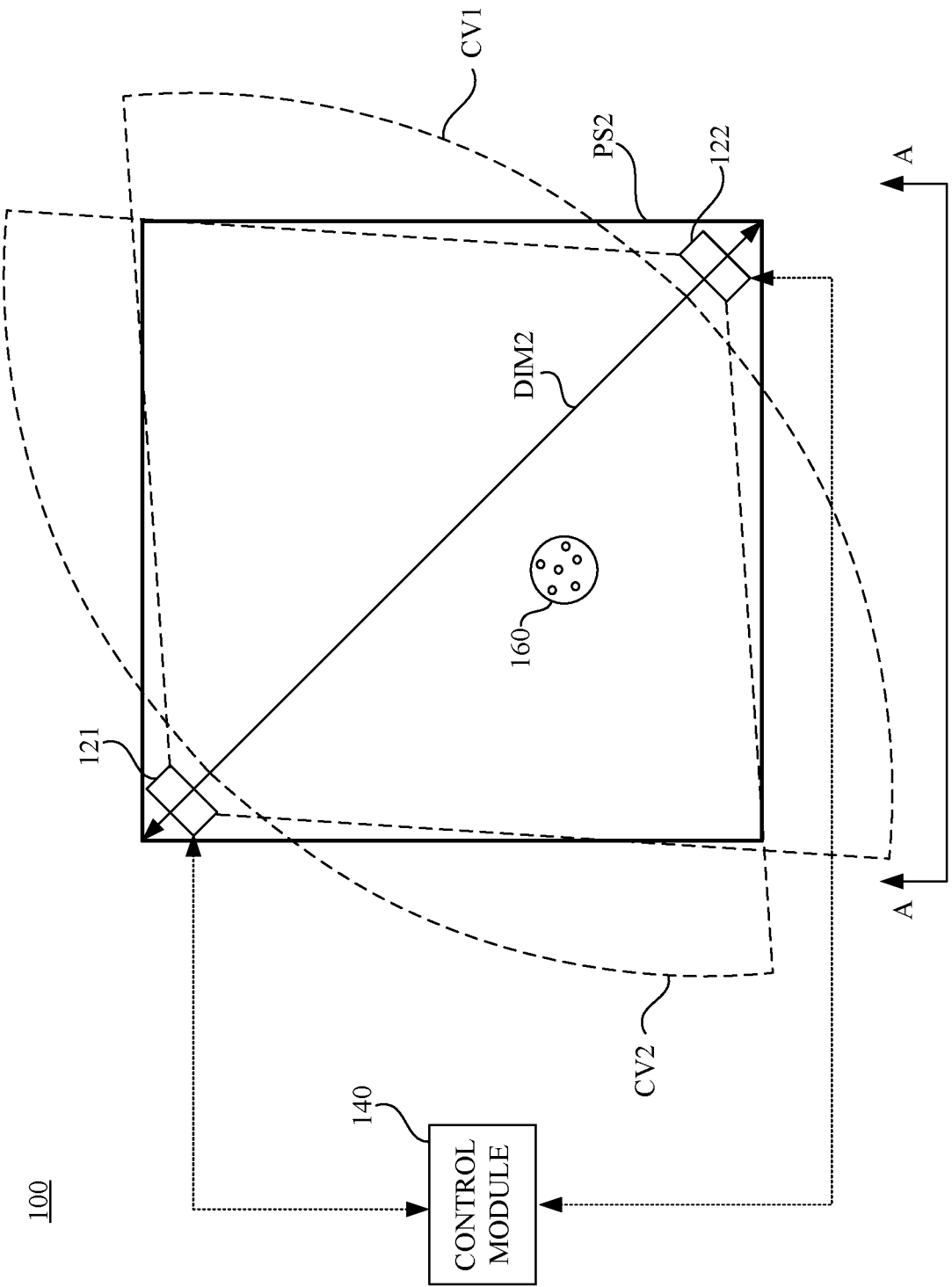
FIG. 4 is a schematic diagram illustrating a top view of coverage regions of the optical signals from the optical source devices in another embodiment.

Reference is further made to FIG. 4. FIG. 4 is a schematic diagram illustrating a top view of the coverage region CV1 of the optical signal from the optical source device 121 and the coverage region CV2 of the optical signal from the optical source device 122 in another physical space PS2 with the dimensional scale DIM2. It is assumed that the optical tracking system 100 is now utilized to a smaller physical space PS2 with a smaller dimensional scale DIM2 (relative to the physical space PS1 shown in FIG. 1 and FIG. 3). In the embodiment shown in FIG. 4, the optical source device 121 also emits the optical signal at the first strength level (which is the same strength level utilized in the embodiment shown in FIG. 3) to form the coverage region CV1, and the optical source device 122 also emits the optical signal at the first strength level (which is the same strength level utilized in the embodiment shown in FIG. 3) to form the coverage region CV2. In the embodiment shown in FIG. 4, the coverage regions CV1 and CV2 extend beyond the border of the physical space PS2, because the physical space PS2 shown in FIG. 4 is smaller than the physical space PS1 shown in FIG. 3, and also because the optical source devices 121 and 122 remain the same first strength level to emit the optical signals.

Figure 5:
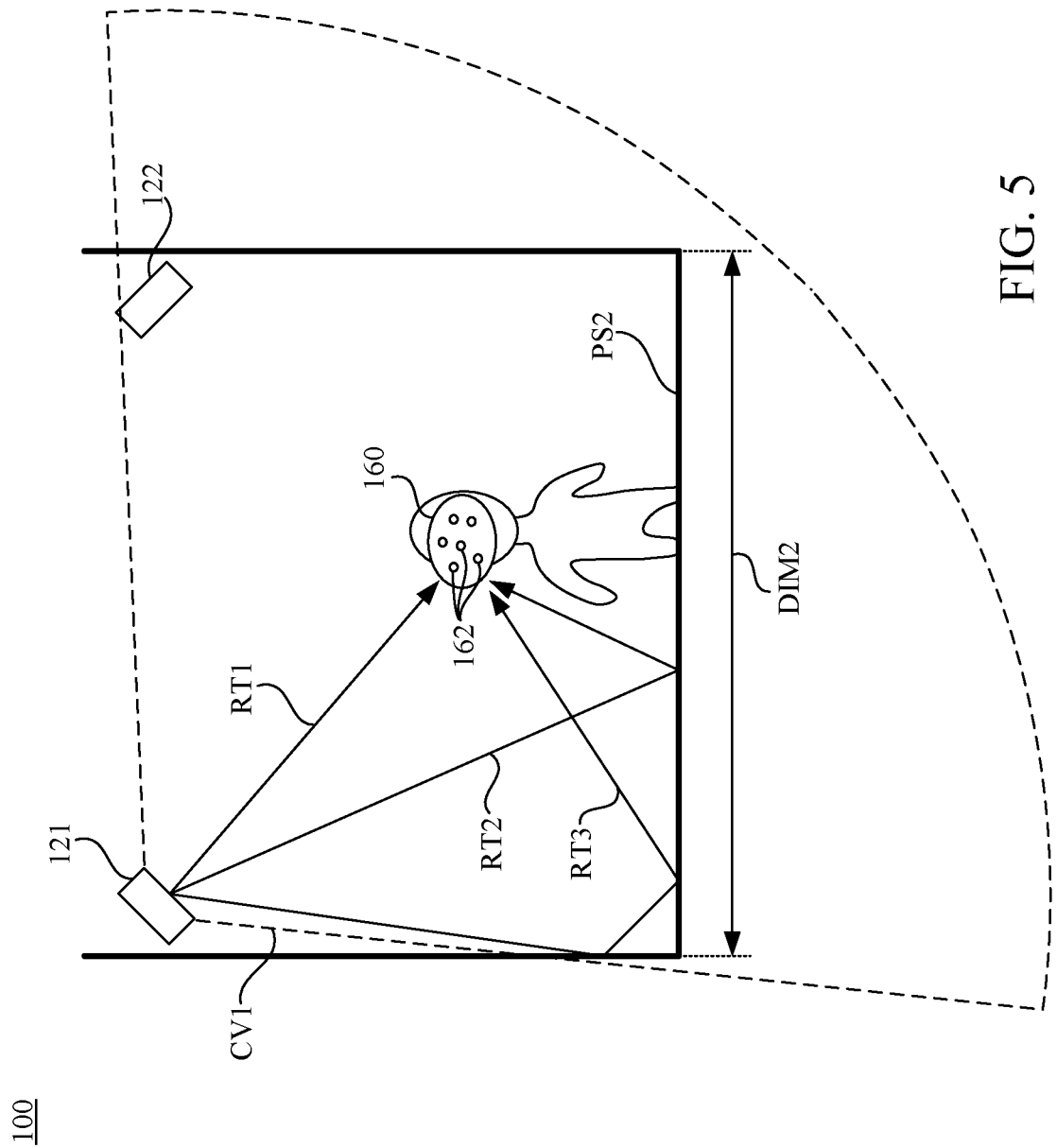
FIG. 5 is a schematic diagram illustrating a side view of the embodiment shown in FIG. 4 along a sectional line.

The embodiment shown in FIG. 4 may cause some reflection issues when the optical sensing module 162 of the electronic device 160 senses the optical signals from the optical source devices 121 and 122. Reference is further made to FIG. 5. FIG. 5 is a schematic diagram illustrating a side view of the embodiment shown in FIG. 4 along a sectional line A-A. As mentioned above, the optical source device 121 emits the optical signal at the first strength level, and the optical signal from the optical source device 121 is able to travel a relative long distance and still be sensible to the optical sensing module 162 of the electronic device 160. In this case, the optical sensing module 162 can sense a detection signal corresponding to the optical signal from the optical source device 121 along a direct route RT1, and the optical sensing module 162 may also sense two detection signals corresponding to the optical signal from the optical source device 121 along other reflective routes RT2 or RT3 as shown in FIG. 5. The detection signals corresponding to the optical signal from the optical source device 121 along other reflective routes RT2 or RT3 are not desirable results to the optical sensing module 162, because the optical signal travelled relative longer distances along the reflective routes RT2 or RT3 may cause a computation error when the optical tracking system 100 calculates a gap distance between the electronic device 160 and the optical source device 121. In addition, the undesirable detection signals may slow down a computation process of the correct detection signal corresponding to the optical signal from the optical source device 121 along a direct route RT1.

Figure 6:
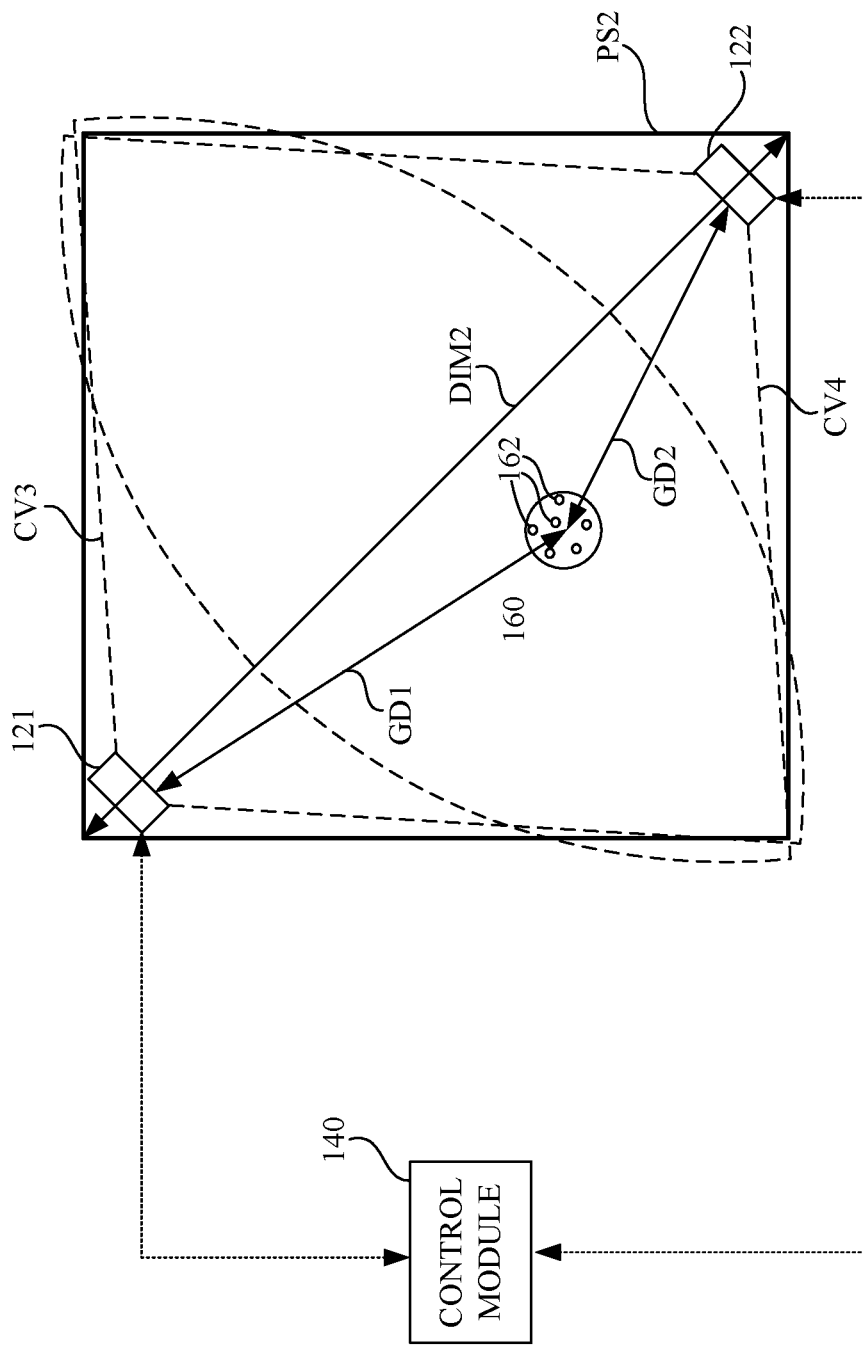
FIG. 6 is a schematic diagram illustrating a top view of coverage regions of the optical signals from the optical source devices in another embodiment.

Reference is further made to FIG. 6. FIG. 6 is a schematic diagram illustrating a top view of a coverage region CV3 of the optical signal from the optical source device 121 and another coverage region CV4 of the optical signal from the optical source device 122 in the physical space PS2 with the dimensional scale DIM2. In the embodiment shown in FIG. 6, the optical source device 121 emits the optical signal at a second strength level to form the coverage region CV3, and the optical source device 122 also emits the optical signal at the second strength level to form the coverage region CV4. In the embodiment shown in FIG. 6, the coverage regions CV3 and CV4 are about to cover the whole physical space PS2 with the dimensional scale DIM2 without significantly extending beyond the border of the physical space PS2. The second strength level utilized in the embodiment shown in FIG. 6 is lower than the first strength level utilized in the embodiment shown in FIG. 3 and FIG. 4.

The coverage regions CV3 and CV4 shown in FIG. 6 are adjusted to be smaller compared to the coverage regions CV1 and CV2 shown in FIG. 3 and FIG. 4 by setting the signal strength of the optical signals emitted by the optical source devices 121 and 122 to the second strength level. Aforesaid adjustments to the signal strength of the optical signals in FIG. 6 is able to avoid the reflective routes RT2 or RT3 as shown in FIG. 5 and also avoid the undesirable detection signals correspondingly.

As shown in FIG. 2, after the dimensional scale to be covered by the optical tracking system 100 is obtained, operation S220 is executed by the control module 140 to adjust the signal strength of the optical signals provided by the optical source devices 121 and 122 according to the dimensional scale. The control module 140 adjusts the signal strength of the optical signals in positive correlation with the dimensional scale. For the physical space PS1 with a relative larger dimensional scale DIM1, the signal strength of the optical signals is adjusted to the first strength level (i.e., higher strength level) to cover the larger space. For the physical space PS2 with a relatively smaller dimensional scale DIM1, the signal strength of the optical signals is adjusted to the second strength level (i.e., lower strength level) to avoid issues caused by the reflective routes RT2 or RT3 shown in FIG. 5.

In the operation S210, the dimensional scale to be covered by the optical tracking system 100 can be obtained by several ways.

In an embodiment, the dimensional scale DIM1/DIM2 is calculated from the detection signals sensed by the optical sensing module 162 of the electronic device 160 as shown in FIG. 6. The optical sensing module 162 of the electronic device 160 is configured to sense the detection signals corresponding to the optical signals from the optical source devices 121 and 122. The detection signals are transmitted to the control module 140. In this case, the dimensional scale DIM1/DIM2 in operation S210 is obtained by the control module, which is configured to calculate a gap distance GD1 (as shown in FIG. 6) between the optical source devices 121 and the electronic device 160 and another gap distance GD2 (as shown in FIG. 6) between the optical source devices 122 and the electronic device 160 according to the detection signals. After the gap distances GD1 and GD2 are calculated, the control module 140 is further configured to calculate the dimensional scale DIM2 according to the gap distances GD1 and GD2. Similarly, the dimensional scale DIM1 of the physical space PS1 shown in FIG. 1 and FIG. 3 can be calculated in the same way.

In another embodiment, the dimensional scale DIM1/DIM2 is calculated from a detection signal sensed by the optical source device 121 or 122. In this embodiment, the optical source device 121 includes an optical sensor. The optical sensor of the optical source device 121 is configured to sense a detection signal corresponding to the optical signal from the optical source device 122. The detection signal will have higher amplitude when the optical source devices 121 and 122 are closer to each other, and the detection signal will have lower amplitude when the optical source devices 121 and 122 are away from each other. The detection signal generated by the optical sensor of the optical source device 121 is transmitted to the control module 140. In this case, the dimensional scale DIM1/DIM2 in operation S210 is obtained by the control module 140, which is configured to calculate a gap distance between the optical source device 121 and the optical source device 122 according to the detection signal. The control module 140 further calculates the dimensional scale DIM1/DIM2 according to the gap distance between the optical source device 121 and the optical source device 122.

In still another embodiment, the dimensional scale is obtained from a scale configuration file stored in the optical tracking system 100. For example, a user can manually input a size (e.g., 5 meters×5 meters, 3 meters×2 meters, or 2.5 meters×2 meters) of the physical space that the user wants to utilize the optical tracking system 100. In this case, the optical tracking system 100 may provide an interface for physical space setup. In some embodiments, the user can manually type in the size, or draw an area on the interface for physical space setup, so as to assign the dimensional scale. The user input can be recorded in the scale configuration file. The optical tracking system 100 is configured to access the scale configuration file for obtaining the dimensional scale.

Based on aforesaid embodiments, the optical tracking system 100 and the control method 200 are able to adjust the signal strength of the optical signals provided by the optical source devices 121 and 122 dynamically according to the dimensional scale to be covered by the optical tracking system. When the dimensional scale is larger, the signal strength is adjusted to be higher. When the dimensional scale is smaller, the signal strength is adjusted to be lower. However, the disclosure is not limited to simply adjust the signal strength of the optical signals provided by the optical source devices 121 and 122.

In some embodiments, the coverage region CV1, CV2, CV3 and CV4 are not only determined by the signal strength of the optical signals provided by the optical source devices 121 and 122. The coverage region CV1, CV2, CV3 and CV4 are also determined by a sensing sensitivity of the optical sensing module 162 on the electronic device 160 in FIG. 1. The control module 140 is further configured to adjust a sensing sensitivity of the optical sensing module 162 on the electronic device 160 according to the dimensional scale. The sensing sensitivity of the optical sensing module 162 is adjusted by the control module 140 to be negatively correlated with the dimensional scale. When the dimensional scale is larger, the signal strength is adjusted to be higher and the sensing sensitivity is adjusted to be lower. When the dimensional scale is smaller, the signal strength is adjusted to be lower and the sensing sensitivity is adjusted to be higher.

In some embodiments, amplitudes of the detection signals detected by the optical sensing module 162 are compared to a threshold amplitude level. When the amplitudes of the detection signals are lower than the threshold amplitude level, the detection signals will be regarded as noise and be ignored. When the amplitudes of the detection signals exceed the threshold amplitude level, the detection signals will be regarded as valid detection signals. The sensing sensitivity can be adjusted by the control module 140 to be higher by reducing the threshold amplitude level. The sensing sensitivity can be adjusted by the control module 140 to be lower by increasing the threshold amplitude level.

Figure 7:
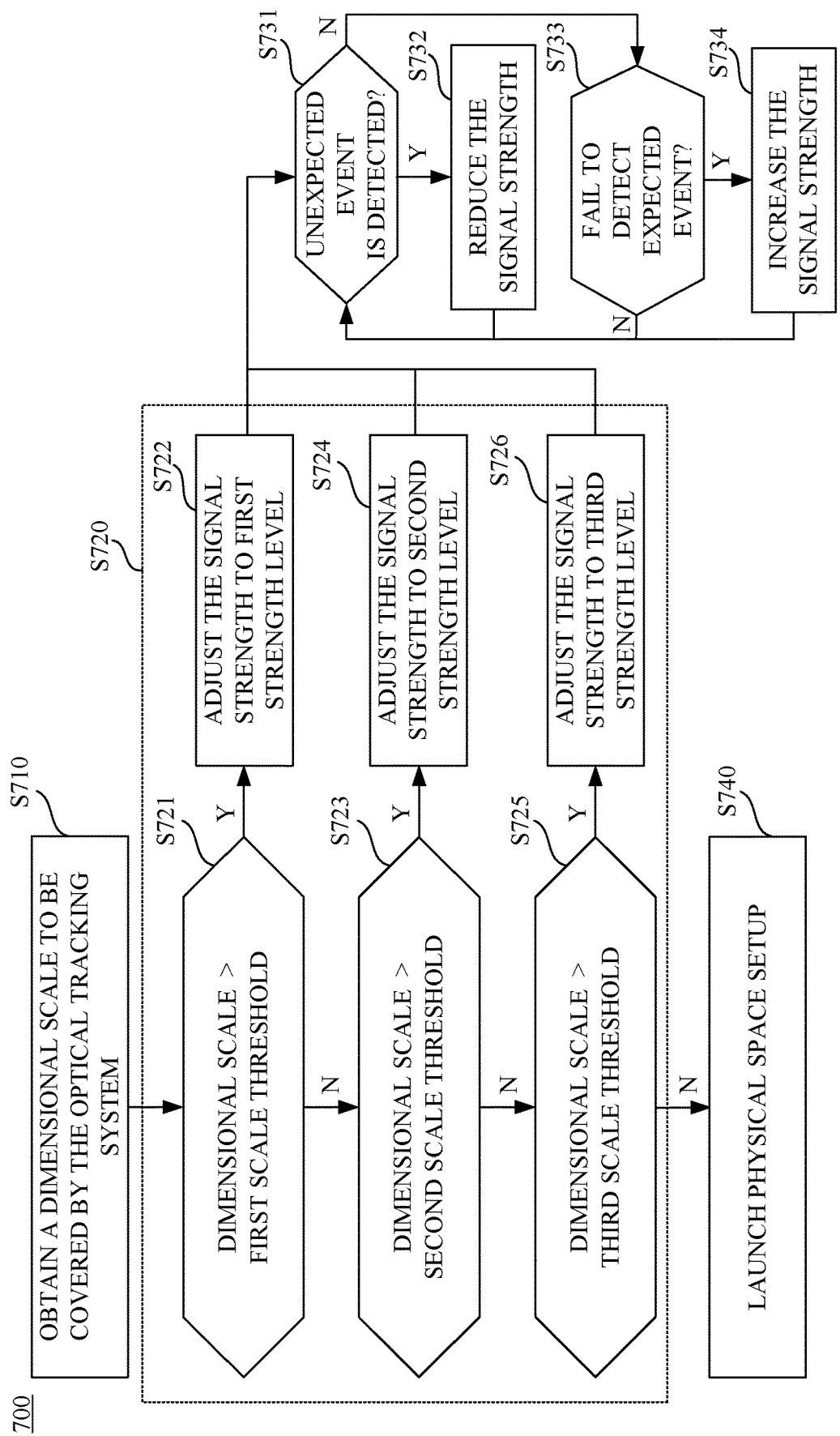
FIG. 7 is a flow diagram illustrating a control method according to another embodiment of the disclosure.

Reference is further made to FIG. 7. FIG. 7 is a flow diagram illustrating a control method 700 according to an embodiment of the disclosure. The control method 700 can be performed by the optical tracking system 100 shown in FIG. 1. As shown in FIG. 7, operation S710 is performed to obtain the dimensional scale to be covered by the optical tracking system 100. How to obtain the dimensional scale is discussed in aforesaid embodiments and not to be repeated here. Operation S720 of the control method 700 is performed to adjusting the signal strength of the optical signals provided by the optical source devices according to the dimensional scale. The signal strength of the optical signals is adjusted to be positively correlated with the dimensional scale. Operation S720 of the control method 700 in the embodiment shown in FIG. 7 includes sub-operations S721-S726.

In sub-operations S721, the dimensional scale is compared to a first scale threshold (e.g., a diagonal length of 5 meters). If the dimensional scale exceeds the first scale threshold (e.g., the dimensional scale has a diagonal length of 6 meters), sub-operations S722 is performed to adjust the signal strength to a first strength level.

If the dimensional scale is smaller than the first scale threshold, sub-operations S723 is performed to compare the dimensional scale with a second scale threshold (e.g., a diagonal length of 4 meters). The second scale threshold is smaller than the first scale threshold. If the dimensional scale exceeds the second scale threshold (e.g., the dimensional scale has a diagonal length of 4.5 meters), sub-operations S724 is performed to adjust the signal strength to a second strength level, which is lower than the first strength level.

If the dimensional scale is smaller than the second scale threshold, sub-operations S725 is performed to compare the dimensional scale with a third scale threshold (e.g., a diagonal length of 2 meters). The third scale threshold is smaller than the second scale threshold. If the dimensional scale exceeds the third scale threshold (e.g., the dimensional scale has a diagonal length of 3 meters), sub-operations S724 is performed to adjust the signal strength to a third strength level, which is lower than the second strength level.

In some embodiments, the third scale threshold can be a minimum value acceptable to the optical tracking system 100. When the dimensional scale is smaller than the third scale threshold, the optical tracking system 100 may not be able to operate correctly. In this case, if the dimensional scale is smaller than the third scale threshold, operation S740 of the control method 700 is performed to launch an interface for physical space setup. The interface for physical space setup can be displayed to the user, and the user can manually assign the dimensional scale to be covered by the optical tracking system 100.

In the embodiment shown in FIG. 7, the control method 700 is able to further reduce or increase the signal strength of the optical signals provided by the optical source devices after the signal strength is adjusted according to the dimensional scale in aforesaid operations S722, S724 or S726. Reference is made to FIG. 5 and FIG. 7. As shown in FIG. 5, the optical sensing module 162 of the electronic device 160 is configured to sense detection signals corresponding to the optical signals from the optical source devices 121 and 122.

As shown in FIG. 7, operation S731 is performed to determine whether an unexpected event is detected by the optical sensing module 162 in the detection signals corresponding to the optical signals from the optical source devices 121 and 122. If the unexpected event is detected in the optical sensing module 162, operation S732 is performed to further reduce the signal strength of the optical signals provided by the optical source devices.

If the unexpected event is not detected in the optical sensing module 162, operation S733 is performed to determine whether the optical sensing module fails to detect an expected event in the detection signals corresponding to the optical signals from the optical source devices 121 and 122. If the optical sensing module 162 fails to detect the expected event, operation S734 is performed to further increase the signal strength of the optical signals provided by the optical source devices.

Reference is further made to FIGS. 8A-8D. FIGS. 8A-8D illustrate waveforms of one detection signal detected by optical sensing module 162 corresponding to different embodiments. In an embodiment, each of the optical signals is generated according to a predetermined emitting pattern. For example, each of the optical signals generated according to the predetermined emitting pattern will has one long pulse (emitted by a light emitting diode of the optical source device 121/122) and one short pulse (emitted by a laser generator of the optical source device 121/122) in one emitting frame. In this case, the detection signal DS1 detected by optical sensing module 162 corresponding to the optical signals generated according to the predetermined emitting pattern is shown in FIG. 8A. As shown in FIG. 8A, the detection signal DS1 includes one long pulse P1/P3/P5 and one short pulse P2/P4/P6 in each frame FR. The detection signal DS1 shown in FIG. 8A is an example of expect events corresponding to the predetermined emitting pattern. A time gap between the long pulse P1 and the short pulse P2 can be utilized to calculate a distance between the electronic device 160 and the optical source device 121/122.

However, as shown in the embodiment of FIG. 5, if the optical signals along the reflective routes RT2 or RT3 are detected by optical sensing module 162, the detection signal may have some unexpected event other than the waveform shown in FIG. 8A. As shown in FIG. 8B, the detection signal DS2 includes two long pulses P1a and P1b (also two long pulses P3a and P3b, and another two long pulses P5a and P5b) in one frame FR. One of these two long pulses P1a and P1b may be induced by the optical signals along the reflective routes RT2 or RT3. In this case, the unexpected event is detected in the detection signal DS2 because the detection signal DS2 includes an unexpected radiation pulse over the predetermined emitting pattern. In this case, the operation S732 is performed by the control module 140 to reduce the signal strength of the optical signals provided by the optical source devices.

As shown in FIG. 8C, the detection signal DS3 includes two short pulses P2a and P2b (also two short pulses P4a and P4b, and another two short pulses P6a and P6b) in one frame FR. One of these two short pulses P2a and P2b may be induced by the optical signals along the reflective routes RT2 or RT3. In this case, the unexpected event is detected in the detection signal DS3 because the detection signal DS3 includes an unexpected radiation pulse over the predetermined emitting pattern. In this case, the operation S732 is performed by the control module 140 to reduce the signal strength of the optical signals provided by the optical source devices.

As shown in FIG. 8D, the detection signal DS4 includes no obvious radiation pulse over an amplitude threshold value. In this case, the optical sensing module 162 fails to detect an expected event (e.g., as the detection signal DS1 shown in FIG. 8A) within the detection signal DS4. In some cases, the detection signal DS4 detected in the optical sensing module 162 does not include the expected event because the signal strength of the optical signals provided by the optical source devices is too low. The operation S734 is performed by the control module 140 to increase the signal strength of the optical signals provided by the optical source devices.

FIGS. 8A-8D illustrate waveforms of one detection signal corresponding to the predetermined emitting pattern (one long pulse and one short pulse in one emitting frame) of the optical signals. However, the disclosure is not limited thereto.

Figure 9A:
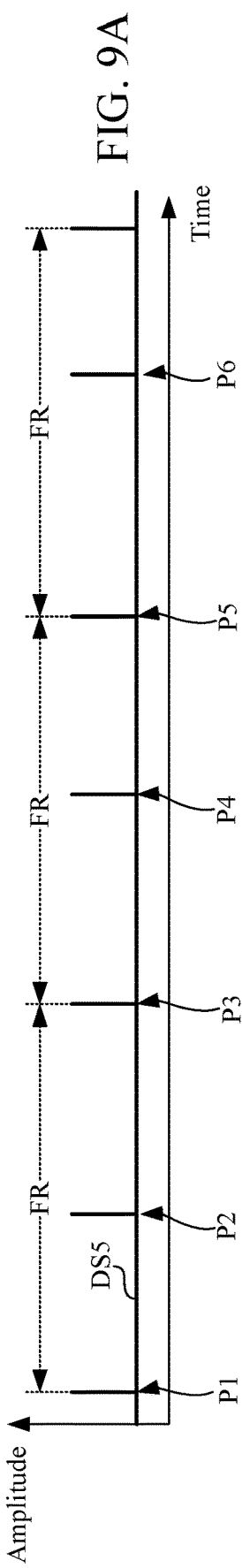
FIGS. 9A-9C illustrate waveforms of one detection signal corresponding to another predetermined emitting pattern of the optical signals.
Figure 9B:
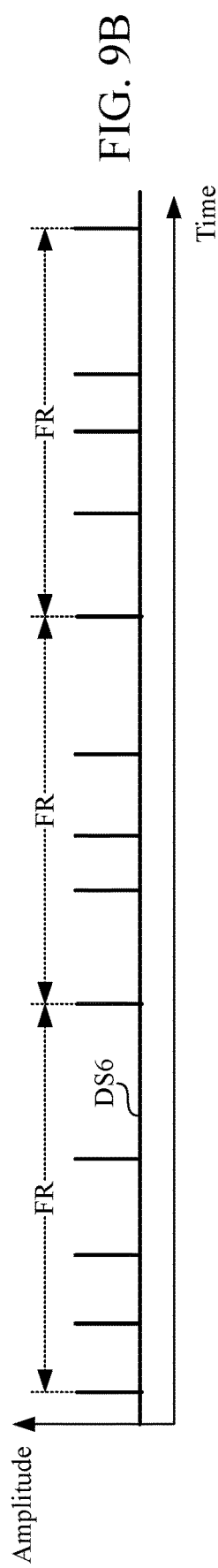
Figure 9C:
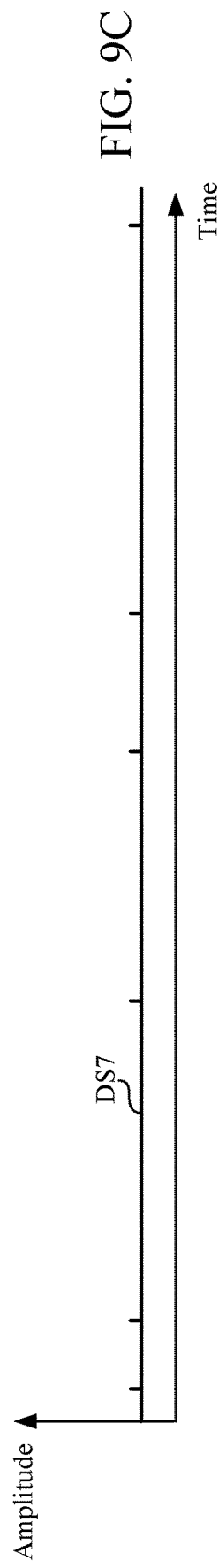

FIGS. 9A-9C illustrate waveforms of one detection signal corresponding to another predetermined emitting pattern of the optical signals. As shown in FIG. 9A, the predetermined emitting pattern include two short pulses in one emitting frame. As shown in FIG. 9A, the detection signal DS5 includes two short pulses P1 and P2 in the first frame FR (two short pulses P3 and P4 in the second frame FR, and two short pulses P5 and P6 in the third frame FR). A time gap between the short pulse P1 and the short pulse P2 can be utilized to calculate a distance between the electronic device 160 and the optical source device 121/122. As shown in FIG. 9B, the detection signal DS6 includes more than two pulses in one frame FR. In this case, the unexpected event is detected in the detection signal DS6. In this case, the operation S732 is performed by the control module 140 to reduce the signal strength of the optical signals provided by the optical source devices.

As shown in FIG. 9C, the detection signal DS7 includes no obvious radiation pulse over an amplitude threshold value. In this case, the optical sensing module 162 fails to detect an expected event (e.g., as the detection signal DS5 shown in FIG. 9A) within the detection signal DS7. In this case, the operation S734 is performed by the control module 140 to increase the signal strength of the optical signals provided by the optical source devices.

Based on the control method 700 of the embodiment shown in FIG. 7, the signal strength of the optical signals provided by the optical source devices can be dynamically adjusted according to the dimensional scale, and also dynamically adjusted according to unexpected event and the expected event in the detection signals sensed by the electronic device.

Figure 10:
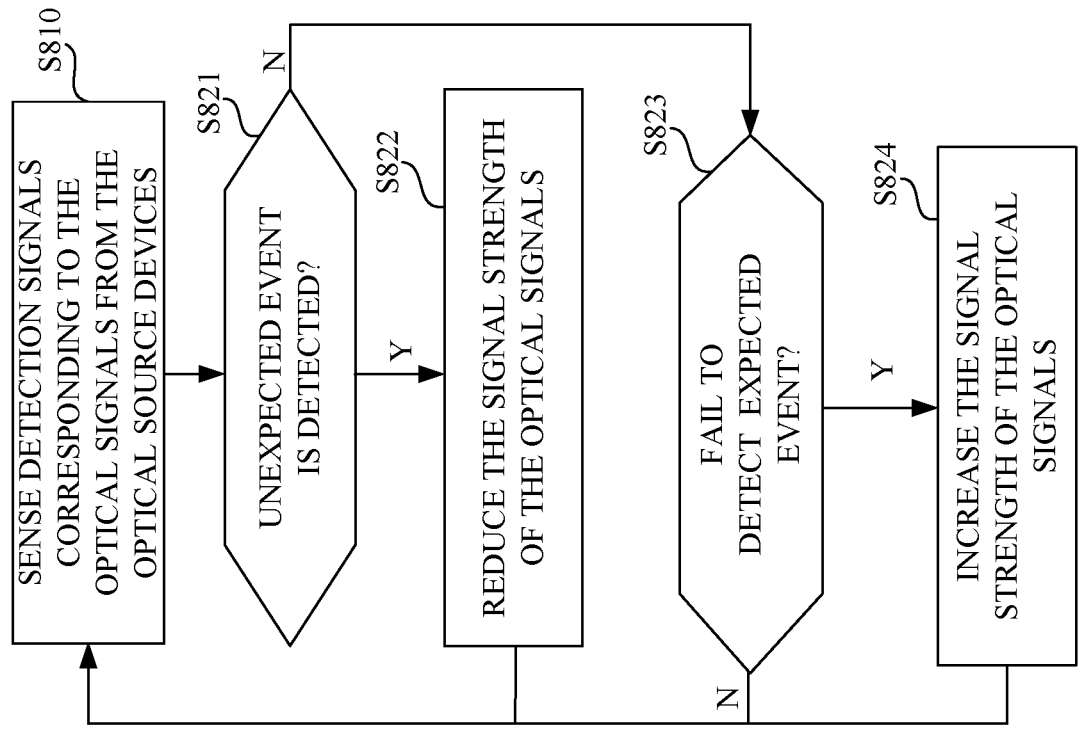
FIG. 10 is a flow diagram illustrating a control method according to another embodiment of the disclosure.

Reference is further made to FIG. 10, which is a flow diagram illustrating a control method 800 according to another embodiment of the disclosure. The control method 800 is suitable to be utilized on the optical tracking system 100 shown in FIG. 1. The optical tracking system 100 includes optical source devices 121 and 122. The optical source devices 121 and 122 are configured to emitting optical signals according a predetermined emitting pattern. The optical tracking system is configured to track the position of the electronic device 160. The electronic device 160 an optical sensing module configured to sense detection signals corresponding to the optical signals from the optical source devices 121 and 122.

Operation S810 is performed to sense detection signals corresponding to the optical signals from the optical source devices 121 and 122. Operation S821 is performed to determine whether an unexpected event in detected in the detection signals. The unexpected event can be detected when the detection signals includes an unexpected radiation pulse over the predetermined emitting pattern. Further details about definition of the unexpected event and how to detect the unexpected event has been discussed in embodiments shown in FIGS. 8B-8C and FIG. 9B. If the unexpected event in detected in the detection signals, operation S822 is performed to reduce the signal strength of the optical signals.

If the unexpected event in not detected, operation S823 is performed to determine whether the optical sensing module 162 fails to detect the expected event within the detection signals. The expected event includes periodic radiation pulses corresponding to the predetermined emitting pattern. Further details about definition of the expected event and how to detect the expected event has been discussed in embodiments shown in FIG. 8A, FIG. 8D, FIG. 9A and FIG. 9C. If the optical sensing module 162 fails to detect the predetermined emitting pattern within the detection signals, operation S824 is performed to increase the signal strength of the optical signals.

Based on the control method 800 of the embodiment shown in FIG. 10, the signal strength of the optical signals provided by the optical source devices can be dynamically adjusted according the unexpected event and the expected event in the detection signals sensed by the electronic device.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A control method, suitable for an optical tracking system comprising a plurality of optical source devices located at different positions and being configured to emitting a plurality of optical signals from different directions toward an electronic device, the electronic device configured to sense the optical signals from the different directions, the control method comprising:
   calculating a plurality of gap distances between the optical source devices located at the different positions and the electronic device respectively according to the sensed optical signals;
   obtaining a dimensional scale of a physical space to be covered by the optical tracking system according to the gap distances;
   adjusting a signal strength of the optical signals according to the dimensional scale; and
   adjusting a sensing sensitivity of the electronic device according to the dimensional scale of the physical space to be covered by the optical tracking system.

2. The control method of claim 1, wherein the control method further comprises:
   reducing the signal strength of the optical signals in response to an unexpected event detected by the electronic device.

3. The control method of claim 2, wherein each of the optical signals is generated according to a predetermined emitting pattern, the unexpected event is determined when an unexpected radiation pulse over the predetermined emitting pattern is detected by the electronic device.

4. The control method of claim 2, wherein the control method further comprises:
   increasing the signal strength of the optical signals in response to that the electronic device fails to detect an expected event within the optical signals.

5. The control method of claim 4, wherein each of the optical signals is generated according to a predetermined emitting pattern, the expected event comprises a plurality of periodic radiation pulses corresponding to the predetermined emitting pattern.

6. A control method, suitable for an optical tracking system configured to emit a plurality of optical signals and to track an optical sensing module, the optical sensing module configured to sense the optical signals from the optical tracking system, the control method comprising:
   reducing a signal strength of the optical signals in response to an unexpected event detected by the optical sensing module; and
   increasing the signal strength of the optical signals in response to that the optical sensing module fails to detect an expected event,
   wherein each of the optical signals is generated according to a predetermined emitting pattern, the unexpected event is detected when the optical signals comprises an unexpected radiation pulse over the predetermined emitting pattern.

7. The control method of claim 6, wherein each of the optical signals is generated according to a predetermined emitting pattern, the expected event comprises a plurality of periodic radiation pulses corresponding to the predetermined emitting pattern.

8. An optical tracking system, comprising:
   a plurality of optical source devices configured to emitting a plurality of optical signals; and
   a control module communicated with the optical source devices, the control module configured to obtain a dimensional scale to be covered by the optical tracking system, and to adjust a signal strength of the optical signals provided by the optical source devices according to the dimensional scale, wherein the control module adjusts the signal strength in correlation with the dimensional scale,
   wherein the optical tracking system is configured to track an optical sensing module, the optical sensing module is configured to sense the optical signals from the optical tracking system, the control module is configured to calculate a plurality of gap distances between the optical source devices and an electronic device, and the control module calculates the dimensional scale according to the gap distances.

9. The optical tracking system of claim 8, wherein the optical tracking system is configured to track a position of the electronic device, the electronic device comprises an optical sensing module configured to sense a plurality of detection signals corresponding to the optical signals from the optical source devices, the control module is configured to adjust a sensing sensitivity of the optical sensing module on the electronic device according to the dimensional scale, the sensing sensitivity of the optical sensing module is adjusted in negative correlation with the dimensional scale.

10. The optical tracking system of claim 8, wherein the optical tracking system is configured to track a position of an electronic device, the electronic device comprises an optical sensing module configured to sense a plurality of detection signals corresponding to the optical signals from the optical source devices, the control module is configured to reduce the signal strength of the optical signals in response to that an unexpected event is detected by the optical sensing module in the detection signals.

11. The optical tracking system of claim 10, wherein each of the optical signals is generated according to a predetermined emitting pattern, the unexpected event is detected when the detection signals comprising an unexpected radiation pulse over the predetermined emitting pattern.

12. The optical tracking system of claim 10, wherein the control module increases the signal strength of the optical signals in response to that the optical sensing module fails to detect an expected event within the detection signals.

13. The optical tracking system of claim 12, wherein each of the optical signals is generated according to a predetermined emitting pattern, the expected event comprises a plurality of periodic radiation pulses corresponding to the predetermined emitting pattern.

14. A control method, suitable for an optical tracking system comprising a first optical source device and a second optical source device, the first optical source device and the second optical source device configured to emit a plurality of optical signals, wherein the first optical source device comprises an optical sensor configured to sense one of the optical signals from the second optical source device, the control method comprising:
- calculating a gap distance between the first optical source device and the second optical source device;
- obtaining a dimensional scale to be covered by the optical tracking system according to the gap distance; and
- adjusting a signal strength of the optical signals provided by the first optical source device and the second optical source device according to the dimensional scale, wherein the signal strength of the optical signals is related to the dimensional scale.

15. An optical tracking system, comprising:
- a first optical source device configured to emit a plurality of first optical signals;
- a second optical source device configured to emit a plurality of second optical signals; and
- a control module coupled with the first optical source device and the second optical source device, the control module configured to obtain a dimensional scale to be covered by the optical tracking system, and to adjust a signal strength of the first optical signals and the second optical signals provided by the first optical source device and the second optical source device according to the dimensional scale, wherein the control module adjusts the signal strength related to the dimensional scale, wherein the first optical source device comprises an optical sensor, the optical sensor is configured to sense one of the second optical signals from the second optical source device, the control module is configured to calculate a gap distance between the first optical source device and the second optical source device, and the control module is configured to calculate the dimensional scale according to the gap distance.

* * * * *